(12) United States Patent
Jia et al.

(10) Patent No.: US 10,165,507 B2
(45) Date of Patent: Dec. 25, 2018

(54) NETWORK ACCESS METHOD AND APPARATUS APPLIED TO MOBILE APPLICATION

(71) Applicant: TENCENT TECHNOLOGY (SHENZHEN) COMPANY LIMITED, Shenzhen (CN)

(72) Inventors: Zhubin Jia, Shenzhen (CN); Changwen Yuan, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 180 days.

(21) Appl. No.: 15/203,337

(22) Filed: Jul. 6, 2016

(65) Prior Publication Data

US 2016/0316423 A1 Oct. 27, 2016

Related U.S. Application Data

(63) Continuation of application No. PCT/CN2015/072216, filed on Feb. 4, 2015.

(30) Foreign Application Priority Data

Feb. 14, 2014 (CN) .......................... 2014 1 0052559

(51) Int. Cl.
  *H04L 12/28* (2006.01)
  *H04W 48/00* (2009.01)
  (Continued)

(52) U.S. Cl.
  CPC ........... *H04W 48/17* (2013.01); *H04L 41/083* (2013.01); *H04L 61/1541* (2013.01); *H04W 4/20* (2013.01)

(58) Field of Classification Search
  CPC ...... H04W 48/17; H04W 4/20; H04L 41/083; H04L 61/1541
  See application file for complete search history.

(56) References Cited

U.S. PATENT DOCUMENTS

| | | | |
|---|---|---|---|
| 2001/0014095 A1 | 8/2001 | Kawahata et al. | |
| 2003/0188017 A1* | 10/2003 | Nomura | H04L 12/14 709/241 |
| 2017/0199924 A1* | 7/2017 | Gokhale | G06F 17/30575 |

FOREIGN PATENT DOCUMENTS

| | | |
|---|---|---|
| CN | 101026513 A | 8/2007 |
| CN | 101102471 A | 1/2008 |
| | (Continued) | |

OTHER PUBLICATIONS

The World Intellectual Property Organization (WIPO) International Search Report for PCT/CN2015//072216 dated Apr. 29, 2015.
(Continued)

*Primary Examiner* — Clemence S Han
(74) *Attorney, Agent, or Firm* — Anova Law Group, PLLC

(57) ABSTRACT

A network access method and apparatus applied to a mobile application is described. The network access method applied to a mobile application includes: acquiring a prestored IP address in the mobile application, the prestored IP address being an IP address that is obtained when the mobile application previously accessed a first network, of a network service accessible to the mobile application; determining whether the mobile application accesses the first network again; and accessing the first network based on the stored IP address if the mobile application accesses the first network again. By using the present disclosure, the problem that a long time is consumed for network access of a mobile
(Continued)

application is solved, and the effect of reducing the time consumed for the network access is achieved.

12 Claims, 5 Drawing Sheets

(51) Int. Cl.
*H04L 12/24* (2006.01)
*H04L 29/12* (2006.01)
*H04W 4/20* (2018.01)

(56) References Cited

FOREIGN PATENT DOCUMENTS

| CN | 101645907 A | 2/2010 |
|---|---|---|
| CN | 101904202 A | 12/2010 |
| CN | 102137458 A | 7/2011 |
| CN | 102413145 A | 4/2012 |

OTHER PUBLICATIONS

The State Intellectual Property Office of the People's Republic of China (SIPO), Office Action 1 for 201410052559.9, dated Aug. 28, 2018, 7 Pages (including translation).

* cited by examiner

NETWORK ACCESS METHOD AND APPARATUS APPLIED TO MOBILE APPLICATION

CROSS-REFERENCES TO RELATED APPLICATIONS

This application is a continuation of PCT Application No. PCT/CN2015/072216, filed on Feb. 4, 2015, which claims priority of Chinese Patent Application No. 2014100525599, filed on Feb. 14, 2014. The entire content of the two applications is incorporated by reference herein.

FIELD OF THE TECHNOLOGY

The present disclosure relates to the field of mobile applications, and in particular, to a network access method and apparatus applied to a mobile application.

BACKGROUND OF THE DISCLOSURE

With the development of communications technologies, especially the development of Internet technologies, increasingly more users begin to come into contact with or use mobile applications. A mobile application is an application that is used in a mobile terminal and needs to be connected to a network for acquiring data. In a process of using a mobile application, a connection speed of a mobile network not only affects product experience of the mobile application, but also is closely associated with economic benefits of a developer of the mobile application.

In a use scenario of a mobile application, different from the simplicity of a conventional network environment for an Internet application of a personal computer (PC), a network environment of the mobile application changes frequently, and the network environment also becomes more complicated. For example, for a mobile terminal having a 3G card installed, the mobile terminal is connected to a 3G network environment on the way to work; the mobile terminal automatically switches to a Wifi network environment upon arrival at an office environment with Wifi; and the mobile terminal again switches to a new Wifi network environment upon return to a home with Wifi. It can be seen that, the mobile terminal can automatically switch a connection state at any time according to a change of an external network environment.

In order to enable a mobile application to acquire data more rapidly and conveniently, generally a plurality of backend data services is deployed in network environments, such as China Mobile, China Unicom, and China Telecom, to reduce time consumed for acquiring data. Therefore, how a mobile application rapidly and accurately selects an IP address of a network service in a network environment when the network environment of a mobile terminal changes will be an important factor that affects a speed at which the mobile application accesses a network.

When a mobile application is connected to a network or when a network environment changes, the mobile application needs to report a network environment, for example, an IP address and a network type (2G, 3G, Wifi, and the like), of a mobile terminal to a network access apparatus corresponding to the mobile application. The network access apparatus calculates, according to a current network environment of the mobile application, a batch of IP addresses of optimal network services and a network quality situation of each IP address, and returns the batch of IP addresses of optimal network services and the network quality situation of each IP address to the mobile application. The mobile application selects an IP address having the highest network quality for connection, and after the connection fails, may select a network environment having slightly lower network quality for connection; this process is sequentially executed until a network service is successfully connected.

In this scenario, each time a network environment of a mobile device changes, all mobile applications on the mobile device need to acquire data, which leads to a long time consumed for network access.

Currently, no effective solution is proposed for the problem that a long time is consumed for network access of a mobile application in the existing technology.

SUMMARY

Embodiments of the present disclosure is to provide a network access method and apparatus applied to a mobile application, so as to solve the problem that a long time is consumed for network access of a mobile application.

According to one aspect of the present disclosure, a network access method applied to a mobile application is provided. The network access method applied to a mobile application according to the present disclosure includes: acquiring a prestored IP address in the mobile application, the prestored IP address being an IP address that is obtained when the mobile application previously accessed a first network, of a network service accessible to the mobile application; determining whether the mobile application accesses the first network again; and accessing the first network based on the stored IP address if the mobile application accesses the first network again.

According to another aspect of the present disclosure, a network access apparatus applied to a mobile application is provided. The network access apparatus applied to a mobile application according to the present disclosure includes: an acquiring unit, configured to acquire a prestored IP address in the mobile application, the prestored IP address being an IP address that is obtained when the mobile application previously accessed a first network, of a network service accessible to the mobile application; a determining unit, configured to determine whether the mobile application accesses the first network again; and an access unit, configured to access the first network based on the stored IP address when the mobile application accesses the first network again.

By using embodiments of the present invention, a network access request does not need to be sent, the number of times for requesting a network access state is reduced, the problem that a long time is consumed for network access of the mobile application is solved, and the effect of reducing the time consumed for the network access is achieved.

BRIEF DESCRIPTION OF THE DRAWINGS

The accompanying drawings that constitute a part of this application are used to further understand the present disclosure, and the exemplary embodiments of the present invention and the descriptions thereof are used to explain the present disclosure but are not construed as an inappropriate limitation to the present disclosure. In the accompanying drawings.

DESCRIPTION OF EMBODIMENTS

It should be noted that the embodiments of this application and the features in the embodiments can be combined with each other providing that no conflict occurs. The following describes the present disclosure in detail with reference to the accompanying drawings and in combination with the embodiments.

To enable a person skilled in the art to better understand the solutions of the present disclosure, the following clearly and completely describes the technical solutions in the embodiments of the present invention with reference to the accompanying drawings in the embodiments of the present invention. Apparently, the described embodiments are some of the embodiments of the present invention rather than all of the embodiments. All other embodiments obtained by a person of ordinary skill in the art based on the embodiments of the present invention without creative efforts shall fall within the protection scope of the present disclosure.

It should be noted that the terms such as "first" and "second" in the specification, the claims, and the foregoing accompanying drawings of the present disclosure are used to differentiate similar objects, and are not necessarily used to describe a specific sequence or order. It should be understood that such data used in this way is interchangeable in an appropriate situation for describing the embodiments of the present invention herein. In addition, the terms "include", "have", and any variants thereof are intended to cover nonexclusive inclusions. For example, a process, a method, a system, a product, or a device including a series of steps or units is not necessarily limited to the steps or units clearly listed therein, but can include other steps or units that are not clearly listed or that are inherent to the process, method, product, or device.

An embodiment of the present invention provides a network access apparatus applied to a mobile application. The apparatus may implement its functions by using a device such as a mobile terminal.

Figure 1:
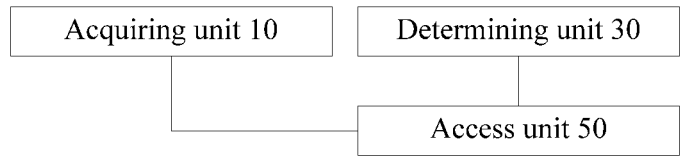
FIG. 1 is a schematic diagram of a network access apparatus applied to a mobile application according to some embodiments of the present invention.

FIG. 1 is a schematic diagram of a network access apparatus applied to a mobile application according to some embodiments of the present invention. As shown in FIG. 1, the network access apparatus applied to a mobile application includes an acquiring unit 10, a determining unit 30, and an access unit 50.

The acquiring unit 10 is configured to acquire a prestored IP address in the mobile application, the prestored IP address being an IP address that is obtained when the mobile application previously accessed a first network, of a network service accessible to the mobile application.

There may be one or more prestored IP addresses in the mobile application. When there is a plurality of prestored IP addresses, the prestored IP addresses may be in a prestored IP address list in the mobile application. The mobile application may be mobile application software or a mobile application program. The mobile application may be an application that is used in a mobile terminal and needs to be connected to a network for acquiring data. The mobile terminal may be a device such as a mobile phone or a tablet computer, but is not limited to these devices. When the mobile application accesses the first network for the first time, that is, when a mobile terminal in which the mobile application is located is in a new network environment and the mobile application accesses the new network environment for the first time, an IP address of a network service accessible to the mobile application in the network environment is acquired and the acquired IP address is stored in the mobile application locally. The network service accessible to the mobile application may be a server, in a network accessible to the mobile application, corresponding to the mobile application in the network environment. First access to the first network by the mobile application may be referred to as historical access to the first network when the network is accessed again. Certainly, the historical access to the first network may also be network access prior to current access to the first network. In this embodiment of the present invention, the mobile terminal may be a carrier for the mobile application to access the network. Access of the mobile terminal to the network serves as a basis for the mobile application to access the network, that is, the mobile application accesses the network under a premise that the mobile terminal has a function of accessing the network. The mobile terminal accesses the network and the mobile application determines an IP address of the accessed network. The mobile application may acquire data by using the IP address of the network service of the network after the mobile terminal accesses the network. After the mobile terminal accesses the network, the mobile application may access the network, or may not access the network. Therefore, after the mobile terminal accesses the network, it is determined whether the mobile application accesses the network.

The determining unit 30 is configured to determine whether the mobile application accesses the first network again.

The mobile application may store, in the mobile application locally after accessing the first network for the first time, the IP address of the network service accessible to the mobile application in the network environment; therefore, when a mobile device in which the mobile application is located is in the network environment and the mobile application accesses a network in the environment, the mobile application may first detect a historical network access record of the mobile application, and determine whether the network is accessed before, that is, determine whether the mobile application accesses the first network again, and if determining that the mobile application accesses the first network again, may directly acquire the IP address, corresponding to the network and stored in the mobile application locally, of the accessible network service.

The access unit 50 is configured to access the first network based on the stored IP address when the mobile application accesses the first network again.

If the mobile application accesses the first network again, that is, when determining that the mobile application accesses the first network again, the mobile application may access the first network based on the prestored IP address in the mobile application.

In this embodiment of the present invention, when the mobile application accesses the first network for the first time, the mobile application needs to establish a connection to the network access apparatus and send a network access request to the network access apparatus of the network, for requesting to acquire an IP address of a currently accessible network service. IP addresses of accessible network services may be in an IP address list obtained from a plurality of IP addresses. The network access apparatus calculates, according to a current network environment of the mobile application, a batch of IP addresses of network services having optimal network quality and network quality of the IP addresses and returns the batch of IP addresses of network services having optimal network quality and the network quality of the IP addresses to the mobile application. The mobile application may select, based on the network quality of the IP addresses returned by the network access apparatus, an IP address having the best network quality to access the first network, where the network quality may be a network connection speed, a network data transmission speed, and data stability. When returning the IP addresses of the accessible network services and the network quality of the IP addresses to the mobile application, the network access apparatus may store the IP addresses and the network quality of the IP addresses in the mobile application locally.

When accessing the same network (that is, the first network) again, the mobile application may directly acquire an IP address corresponding to the network and stored in the mobile application and accesses the first network based on the IP address, so that a network access request does not need to be sent again, the number of times of requesting a network access state is reduced, and a time consumed for the network access of the mobile application is reduced. Certainly, in order to further reduce the time consumed for the network access, the mobile application may further acquire network connection quality of the IP address stored in the mobile application after acquiring the IP address stored in the mobile application, so as to directly access the first network based on the IP address having the optimal network connection quality in the first access without detecting the network connection quality of the IP address. For example, a user uses a mobile application by using a mobile terminal such as a mobile phone. The mobile application may be social networking software such as instant messaging software. After the user enters a new marketplace, where the new marketplace is a marketplace provided with a Wifi network environment, when the user uses the instant messaging software in the network environment, because the network environment is a new network environment with respect to the instant messaging software used by the user, the user needs to establish, when connecting to a Wifi network of the new marketplace by using the instant messaging software, a connection to a network access apparatus first and send a request to the network access apparatus, so as to acquire an IP address of a network service accessible to the instant messaging software in the Wifi network, and then accesses the Wifi network of the new marketplace. After the IP address of the network service accessible to the instant messaging software is acquired, the IP address is stored in the instant messaging software.

When the user enters the marketplace again and uses the same instant messaging software, the instant messaging software does not need to send a request to the network access apparatus, but may directly acquire the IP address corresponding to the Wifi network of the marketplace and prestored in the instant messaging software and access the Wifi network of the marketplace based on the IP address, so as to reduce a time consumed for network access of the instant messaging software.

In this embodiment of the present invention, if the network cannot be accessed based on the prestored IP address acquired from the mobile application (the network cannot be accessed by using all IP addresses when the IP addresses include a plurality of IP addresses), the mobile application needs to establish a connection to the network access apparatus and send a network access request to the network access apparatus of the network, for requesting to acquire an IP address of a currently accessible network service. The network access apparatus calculates, according to a current network environment of the mobile application, a batch of IP addresses of network services having optimal network quality and network quality of the IP addresses and returns the batch of IP addresses of network services having optimal network quality and the network quality of the IP addresses to the mobile application. The mobile application may select, based on the network quality of the IP addresses returned by the network access apparatus, an IP address having the best network quality to access the network.

It should be noted that for a person skilled in the art, in this embodiment of the present invention, when a device in which the mobile application is located enters the network environment, the mobile application may first detect and determine whether the mobile application accesses the first network again, acquire the prestored IP address in the mobile application when determining that the mobile application accesses the first network again, and then accesses the first network based on the stored IP address. The steps of the network access method do not constitute an inappropriate limitation to the present disclosure. In addition, that the mobile application accesses the first network indicates that the mobile terminal in which the mobile application is located also accesses the same network, because the mobile application is run in the mobile terminal.

According to this embodiment of the present invention, when a mobile application accesses a first network previously, an IP address of a network service accessible to the mobile application in the network is stored in the mobile application locally, so that the mobile application may directly acquire the prestored IP address when determining that the mobile application accesses the same network again and accesses the first network based on the IP address. Therefore, a network access request does not need to be sent, the number of times for requesting a network access state is reduced, the problem in the existing technology that a long time is consumed for the network access of the mobile application is solved, and the effect of reducing the time consumed for the network access is achieved.

Figure 2:
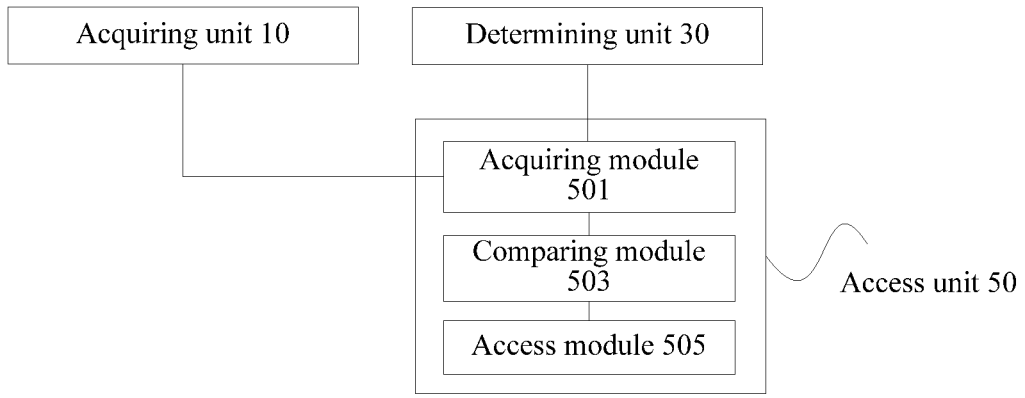
FIG. 2 is a schematic diagram of a network access apparatus applied to a mobile application according to some embodiments of the present invention.

FIG. 2 is a schematic diagram of a network access apparatus applied to a mobile application according to some embodiments of the present invention. This embodiment may be used as a preferred implementation manner of the network access apparatus applied to a mobile application in the foregoing embodiment. As shown in FIG. 2, the network access apparatus applied to a mobile application includes an acquiring unit 10, a determining unit 30, and an access unit

50. The access unit 50 includes an acquiring module 501, a comparing module 503, and an access module 505. The acquiring unit 10 and the determining unit 30 have same functions as the acquiring unit 10 and the determining unit 30 shown in FIG. 1, respectively, but are not limited to the acquiring unit 10 and the determining unit 30 shown in FIG. 1, and details are not described herein again.

Acquired IP addresses are a plurality of IP addresses and an IP address list is obtained from the plurality of IP addresses. Specifically, the mobile application acquires, in first access to a first network, a plurality of IP addresses of accessible network services, obtains an IP address list from the plurality of IP addresses, and stores the IP address list in the mobile application locally. When accessing the network again, the prestored IP address list is directly acquired and the first network is accessed based on the plurality of IP addresses in the IP address list.

The acquiring module 501 is configured to acquire network connection speeds of the plurality of IP addresses in the IP address list.

When it is determined that the mobile application accesses the first network again, the network connection speed may be a speed of the network access, or may be a speed of data transmission between the mobile application and the network after the network access. The acquired network connection speeds of the plurality of IP addresses in the IP address list may be network connection speeds, which are obtained through detection by the mobile application, of the plurality of IP addresses in IP address list, or may be acquired network connection speeds of the plurality of IP addresses stored in the mobile application in historical access to the first network. For example, when accessing the first network for the first time, the mobile application may detect, after acquiring a plurality of IP addresses of accessible network services, a network connection speed of each IP address in the plurality of IP addresses and store the network connection speed of each IP address in the mobile application. When accessing the network again, the mobile application may acquire, after acquiring the plurality of IP addresses stored in the mobile application, the network connection speeds of the plurality of IP addresses prestored in the mobile application, to rapidly acquire an IP address having the highest network connection speed, and access the first network based on the IP address having the highest network connection speed, so as to reduce a time consumed for the network access of the mobile application. Certainly, the mobile application may also directly detect the network connection speeds of the plurality of IP addresses, to acquire an IP address having the highest network connection speed, and access the first network based on the IP address, obtained through detection, having the highest network connection speed.

The comparing module 503 is configured to compare the network connection speeds of the plurality of IP addresses and acquire an IP address having the highest network connection speed in the plurality of IP addresses.

After the network connection speeds of the plurality of IP addresses in the IP address list are acquired, the IP address having the highest network connection speed in the plurality of IP addresses is acquired by comparing the network connection speeds of the plurality of IP addresses. For example, when three IP addresses, which sequentially are 0.0.0.1, 0.0.0.2, and 0.0.0.3, are acquired, where acquired network connection speeds of the three IP addresses sequentially are 1 Mb/s, 2 Mb/s, and 3 Mb/s, the network connection speeds of the three IP addresses are compared to obtain the IP address 0.0.0.3 having the highest network connection speed, and the IP address 0.0.0.3 is acquired, so as to access the first network based on the IP address 0.0.0.3.

The access module 505 is configured to access the first network based on the IP address having the highest network connection speed.

After the IP address having the highest network connection speed in the plurality of IP addresses is acquired, the first network may be accessed based on the IP address having the highest network connection speed, or a network server corresponding to the IP address having the highest network connection speed may be connected to access the first network.

It should be noted that because a network connection speed can reflect network connection quality, in this embodiment of the present invention, acquisition of the network connection speeds of the plurality of IP addresses in the IP address list may be acquisition of network connection quality of the plurality of IP addresses in the IP address list, comparison of the network connection speeds of the plurality of IP addresses may be comparison of the network connection quality of the plurality of IP addresses, acquisition of the IP address having the highest network connection speed in the plurality of IP addresses may be acquisition of an IP address having the optimal network connection quality in the plurality of IP addresses, and access to the network based on the IP address having the highest network connection speed may be access to the network based on the IP address having the optimal network connection quality.

According to this embodiment of the present invention, when accessing the first network again, the mobile application acquires the network connection speeds of the plurality of IP addresses in the IP address list and compares the network connection speeds of the plurality of IP addresses to acquire the IP address having the highest network connection speed, and accesses the first network based on the IP address having the highest network connection speed, so that the mobile application can select an IP address having an optimal network service to access the first network, so as to further reduce the time consumed for accessing the network by the mobile application.

Preferably, the acquiring module 501 includes a first detecting submodule. The first detecting submodule is configured to detect the network connection speeds of the plurality of IP addresses in the IP address list separately. After the prestored IP addresses in the mobile application are acquired, the network connection speeds of the plurality of IP addresses in the IP address list may be separately detected by using the mobile application, so that a network connection speed of an IP address of a currently accessible network service in the network is acquired in time.

Optionally, the acquiring module 501 may include a first acquiring submodule. The first acquiring submodule is configured to acquire the network connection speeds of the plurality of IP addresses prestored in the mobile application. In order to further improve the network access speed, when accessing the network previously, the mobile application needs to detect network connection speeds of IP addresses of accessible network services and stores the detected network connection speeds of the IP addresses of the accessible network services in the mobile application locally, and when accessing the first network again, the mobile application directly acquires the network connection speeds of the plurality of IP addresses prestored in the mobile application, so as to avoid detecting the network connection speeds of the plurality of IP addresses, reduce the time consumed for the network access of the mobile application, and further improve the network access speed.

Preferably, the access module 505 includes a second detecting submodule, a second acquiring submodule, and an access submodule.

The second detecting submodule is configured to redetect the network connection speeds of the plurality of IP addresses in the IP address list every a preset time.

The preset time may be a preset period of time, for example, 5 minutes. The preset time may be set according to an actual network environment. As time goes on, a network connection speed of an IP address may be caused to be different in different phases due to a fault of a network server or impacts of different weather and environments or facilities in the network environment. Therefore, the network connection speeds of the plurality of IP addresses in the IP address list are redetected every the preset time, so as to detect an IP address currently having the highest network connection speed in time. Redetection of the network connection speeds of the plurality of IP addresses in the IP address list may be asynchronous detection performed by using a backend of the mobile application, so as to avoid affecting the use of the mobile application.

The second acquiring submodule is configured to acquire a redetected IP address having the highest network connection speed.

After the network connection speeds of the plurality of IP addresses in the IP address list are detected each time, a redetected IP address having the highest network connection speed needs to be acquired to access the first network based on the IP address having the highest network connection speed.

The access submodule is configured to access the first network based on the redetected IP address having the highest network connection speed.

According to this embodiment of the present invention, network connection speeds of a plurality of IP addresses in an IP address list are redetected every a preset time and a first network is accessed based on an IP address, obtained through redetection, having the highest network connection speed, so that a mobile application can switch to the IP address having the highest network connection speed in time in a running process, so as to improve network connection quality. Meanwhile, because the preset time is set, the problem that the network is unstable and the network quality is reduced due to switching of an IP address of a network service at any time can be avoided, so as to further improve the network connection quality.

Figure 3:
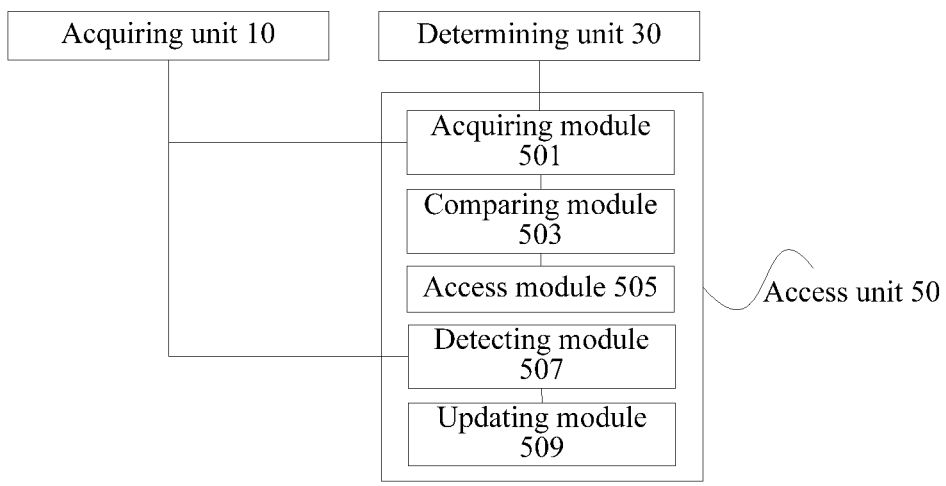
FIG. 3 is a schematic diagram of a network access apparatus applied to a mobile application according to some embodiments of the present invention.

FIG. 3 is a schematic diagram of a network access apparatus applied to a mobile application according to some embodiments of the present invention. This embodiment may be used as a preferred implementation manner of the network access apparatus applied to a mobile application in the foregoing embodiment. As shown in FIG. 3, the network access apparatus applied to a mobile application includes an acquiring unit 10, a determining unit 30, and an access unit 50. The access unit 50 includes an acquiring module 501, a comparing module 503, and an access module 505. The access unit 50 further includes a detecting module 507 and an updating module 509. The acquiring unit 10 and the determining unit 30, as well as the acquiring module 501, the comparing module 503, and the access module 505 in the access unit 50 have same functions as the acquiring unit 10 and the determining unit 30, as well as the acquiring module 501, the comparing module 503, and the access module 505 in the access unit 50 shown in FIG. 2, respectively, but are not limited to the apparatus shown in FIG. 2, and details are not described herein again.

The detecting module 507 is configured to redetect, after the first network is accessed based on the IP address having the highest network connection speed, the network connection speeds of the plurality of IP addresses in the IP address list separately.

After the first network is accessed based on the IP address having the highest network connection speed, separately redetecting the network connection speeds of the plurality of IP addresses in the IP address list may be separately detecting the network connection speeds of the plurality of IP addresses in the IP address list asynchronously at a backend of the mobile application. Because a network connection speed of an IP address in a network service is not unchanged, as time goes on, the network connection speed of the IP address may be caused to be different in different phases due to a fault of a network server or impacts of different weather and environments or facilities in the network environment. Therefore, after the first network is accessed, the network connection speeds of the plurality of IP addresses may be redetected by using the backend, so as to update the network connection speeds of the prestored IP addresses in the mobile application. Meanwhile, the normal use of the mobile application is not affected because the detection can be performed by using the backend. Certainly, after the network connection speeds of the plurality of IP addresses are redetected, it may be further determined whether the IP address of the currently accessed network service is an IP address having the highest network connection speed or having the optimal network connection quality, and if it is determined that the IP address of the currently accessed network service is not the IP address having the highest network connection speed or having the optimal network connection quality, the IP address of the current network access may be switched to the IP address having the highest network connection speed or having the optimal network connection quality, so as to improve the network connection quality in the running process of the mobile application.

The updating module 509 is configured to update, by using the redetected network connection speeds of the plurality of IP addresses, the network connection speeds of the plurality of IP addresses prestored in the mobile application.

After the network connection speeds of the plurality of IP addresses in the IP address list are redetected separately, the network connection speeds of the plurality of IP addresses prestored in the mobile application may be updated by using the redetected network connection speeds of the plurality of IP addresses, that is, the redetected network connection speeds of the plurality of IP addresses are stored in the mobile application locally, so that the mobile application may directly acquire the updated network connection speeds of the plurality of IP addresses when accessing the first network next time.

According to this embodiment of the present invention, network connection speeds of a plurality of IP addresses in an IP address list are redetected separately and network connection speeds of the plurality of IP addresses prestored in a mobile application are updated by using the redetected network connection speeds of the plurality of IP addresses, so that the mobile application can directly acquire, when accessing a network each time, network connection speeds at a previous time and access a first network based on an IP address having the highest network connection speed at the previous time, so as to reduce a time consumed for each network access of the mobile application.

An embodiment of the present invention further provides a network access method applied to a mobile application.

The method is run on an electronic device such as a mobile terminal. It should be noted that the network access method applied to a mobile application in this embodiment of the present invention can be executed by the network access apparatus applied to a mobile application provided in the embodiments of the present invention, and the network access apparatus applied to a mobile application in the embodiments of the present invention may also be used to execute the network access method applied to a mobile application provided in this embodiment of the present invention.

Figure 4:
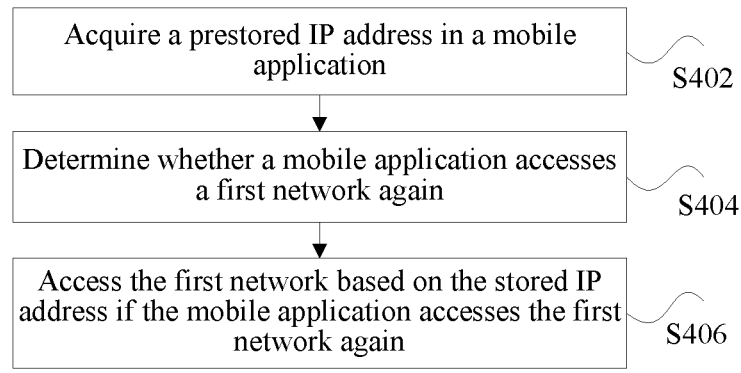
FIG. 4 is a flowchart of a network access method applied to a mobile application according to some embodiments of the present invention.

FIG. 4 is a flowchart of a network access method applied to a mobile application according to some embodiments of the present invention. As shown in FIG. 4, the network access method applied to a mobile application includes the following steps:

Step S402: Acquire a prestored IP address in the mobile application, the prestored IP address being an IP address that is obtained when the mobile application previously accessed a first network, of a network service accessible to the mobile application.

There may be one or more prestored IP addresses in the mobile application. When there is a plurality of prestored IP addresses, the prestored IP addresses may be in a prestored IP address list in the mobile application. The mobile application may be mobile application software or a mobile application program. The mobile application may be an application that is used in a mobile terminal and needs to be connected to a network for acquiring data. The mobile terminal may be a device such as a mobile phone or a tablet computer, but is not limited to these devices. When the mobile application accesses the first network for the first time, that is, when a mobile terminal in which the mobile application is located is in a new network environment and the mobile application accesses the new network environment for the first time, an IP address of a network service accessible to the mobile application in the network environment is acquired and the acquired IP address is stored in the mobile application locally. The network service accessible to the mobile application may be a server, in a network accessible to the mobile application, corresponding to the mobile application in the network environment. First access to the first network by the mobile application may be referred to as historical access to the first network when the first network is accessed again. Certainly, the historical access to the first network may also be network access prior to current access to the first network. In this embodiment of the present invention, the mobile terminal may be a carrier for the mobile application to access the network. Access of the mobile terminal to the network serves as a basis for the mobile application to access the network, that is, the mobile application accesses the network under a premise that the mobile terminal has a function of accessing the network. The mobile terminal accesses the network and the mobile application determines an IP address of the accessed network. After the mobile terminal accesses the network, the mobile application may access the network, or may not access the network. Therefore, after the mobile terminal accesses the network, it is determined whether the mobile application accesses the network.

Step S404: Determine whether the mobile application accesses the first network again.

The mobile application may store, in the mobile application locally after accessing the first network for the first time, the IP address of the network service accessible to the mobile application in the network environment; therefore, when a mobile device in which the mobile application is located is in the network environment and the mobile application accesses a network in the environment, the mobile application may first detect a historical network access record of the mobile application, and determine whether the network is accessed before, that is, determine whether the mobile application accesses the first network again, and if determining that the mobile application accesses the first network again, may directly acquire the IP address, corresponding to the network and stored in the mobile application locally, of the accessible network service.

Step S406: Access the first network based on the stored IP address if the mobile application accesses the first network again.

If the mobile application accesses the first network again, that is, when determining that the mobile application accesses the first network again, the mobile application may access the first network based on the prestored IP address in the mobile application.

In this embodiment of the present invention, when the mobile application accesses the first network for the first time, the mobile application needs to establish a connection to a network access apparatus and send a network access request to the network access apparatus of the network, for requesting to acquire an IP address of a currently accessible network service. IP addresses of accessible network services may be in an IP address list obtained from a plurality of IP addresses. The network access apparatus calculates, according to a current network environment of the mobile application, a batch of IP addresses of network services having optimal network quality and network quality of the IP addresses and returns the batch of IP addresses of network services having optimal network quality and the network quality of the IP addresses to the mobile application. The mobile application may select, based on the network quality of the IP addresses returned by the network access apparatus, an IP address having the best network quality to access the first network, where the network quality may be a network connection speed, a network data transmission speed, and data stability. When returning the IP addresses of the accessible network services and the network quality of the IP addresses to the mobile application, the network access apparatus may store the IP addresses and the network quality of the IP addresses in the mobile application locally.

When accessing the same network (that is, the first network) again, the mobile application may directly acquire an IP address corresponding to the network and stored in the mobile application and accesses the first network based on the IP address, so that a network access request does not need to be sent again, the number of times of requesting a network access state is reduced, and a time consumed for the network access of the mobile application is reduced. Certainly, in order to further reduce the time consumed for the network access, the mobile application may further acquire network connection quality of the IP address stored in the mobile application after acquiring the IP address stored in the mobile application, so as to directly access the first network based on the IP address having the optimal network connection quality in the first access without detecting the network connection quality of the IP address. For example, a user uses a mobile application by using a mobile terminal such as a mobile phone. The mobile application may be social networking software such as instant messaging software. After the user enters a new marketplace, where the new marketplace is a marketplace provided with a Wifi network environment, when the user uses the instant messaging software in the network environment, because the network environment is a new network environment with respect to the instant messaging software used by the user, the user needs to establish, when connecting to a Wifi network of the new marketplace by using the instant messaging software, a connection to a network access apparatus first and send a request to the network access apparatus, so as to acquire an IP address of a network service accessible to the instant messaging software in the Wifi network, and then accesses the Wifi network of the new marketplace. After the IP address of the network service accessible to the instant messaging software is acquired, the IP address is stored in the instant messaging software.

When the user enters the marketplace again and uses the same instant messaging software, the instant messaging software does not need to send a request to the network access apparatus, but may directly acquire the IP address corresponding to the Wifi network of the marketplace and prestored in the instant messaging software and access the Wifi network of the marketplace based on the IP address, so as to reduce a time consumed for network access of the instant messaging software.

In this embodiment of the present invention, if the first network cannot be accessed based on the prestored IP address acquired from the mobile application (the first network cannot be accessed by using all IP addresses when the IP addresses include a plurality of IP addresses), the mobile application needs to establish a connection to the network access apparatus and send a network access request to the network access apparatus of the network, for requesting to acquire an IP address of a currently accessible network service. The network access apparatus calculates, according to a current network environment of the mobile application, a batch of IP addresses of network services having optimal network quality and network quality of the IP addresses and returns the batch of IP addresses of network services having optimal network quality and the network quality of the IP addresses to the mobile application. The mobile application may select, based on the network quality of the IP addresses returned by the network access apparatus, an IP address having the best network quality to access the first network.

It should be noted that, for a person skilled in the art, the sequence numbers of the steps in this embodiment of the present invention are not intended to limit the order. For example, in the network access method applied to a mobile application in this embodiment of the present invention, when a device in which the mobile application is located enters the network environment, the mobile application may first detect and determine whether the mobile application accesses the first network again, acquire the prestored IP address in the mobile application when determining that the mobile application accesses the first network again, and then accesses the first network based on the stored IP address. The steps of the network access method do not construct an inappropriate limitation to the present disclosure. In addition, that the mobile application accesses the first network indicates that the mobile terminal in which the mobile application is located also accesses the same network, because the mobile application is run in the mobile terminal.

According to this embodiment of the present invention, when a mobile application accesses a network previously, an IP address of a network service accessible to the mobile application in the network is stored in the mobile application locally, so that the mobile application may directly acquire the prestored IP address when determining that the mobile application accesses the same network again and accesses the network based on the IP address. Therefore, a network access request does not need to be sent, the number of times for requesting a network access state is reduced, the problem in the existing technology that a long time is consumed for the network access of the mobile application is solved, and the effect of reducing the time consumed for the network access is achieved.

Figure 5:
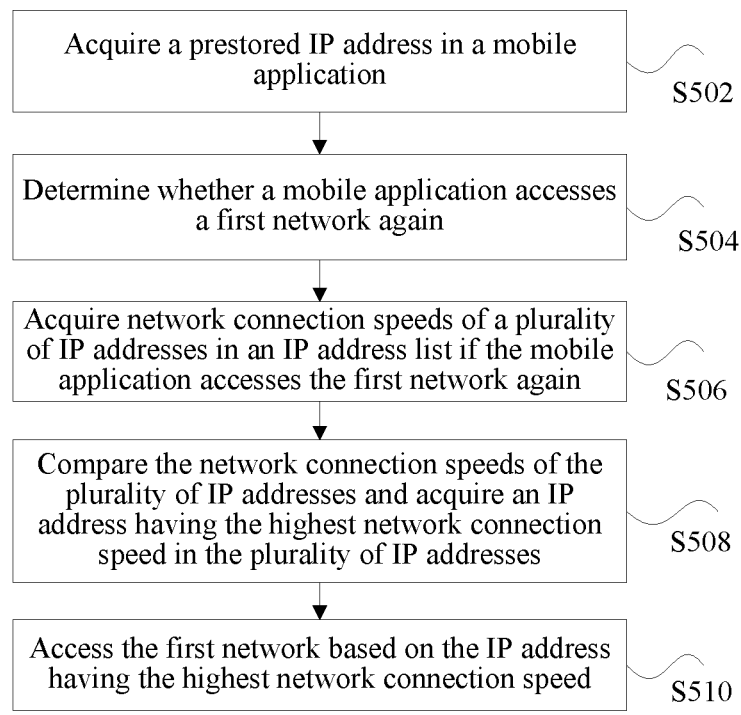
FIG. 5 is a flowchart of a network access method applied to a mobile application according to some embodiments of the present invention.

FIG. 5 is a flowchart of a network access method applied to a mobile application according to some embodiments of the present invention. The network access method applied to a mobile application in this embodiment may be a preferred implementation manner of the network access method applied to a mobile application in the foregoing embodiment. In this embodiment of the present invention, acquired IP addresses are a plurality of IP addresses and an IP address list is obtained from the plurality of IP addresses. Specifically, the mobile application acquires, in first access to a first network, a plurality of IP addresses of accessible services of the first network, obtains an IP address list from the plurality of IP addresses, and stores the IP address list in the mobile application locally. When accessing the network again, the prestored IP address list is directly acquired and the first network is accessed based on the plurality of IP addresses in the IP address list.

As shown in FIG. 5, the network access method applied to a mobile application includes the following steps:

Step S502: Acquire a prestored IP address in the mobile application, the prestored IP address being an IP address that is obtained when the mobile application previously accessed a first network, of a network service accessible to the mobile application.

There may be one or more prestored IP addresses in the mobile application. When there is a plurality of prestored IP addresses, the prestored IP addresses may be in a prestored IP address list in the mobile application. The mobile application may be mobile application software or a mobile application program. The mobile application may be an application that is used in a mobile terminal and needs to be connected to a network for acquiring data. The mobile terminal may be a device such as a mobile phone or a tablet computer, but is not limited to these devices. When the mobile application accesses the first network for the first time, that is, when a mobile terminal in which the mobile application is located is in a new network environment and the mobile application accesses the new network environment for the first time, an IP address of a network service accessible to the mobile application in the network environment is acquired and the acquired IP address is stored in the mobile application locally. The network service accessible to the mobile application may be a server, in a network accessible to the mobile application, corresponding to the mobile application in the network environment. First access to the first network by the mobile application may be referred to as historical access to the first network when the first network is accessed again. Certainly, the historical access to the first network may also be network access prior to current access to the first network.

Step S504: Determine whether the mobile application accesses the first network again.

The mobile application may store, in the mobile application locally after accessing the first network for the first time, the IP address of the network service accessible to the mobile application in the network environment; therefore, when a mobile device in which the mobile application is located is in the network environment and the mobile application accesses a network in the environment, the mobile application may first detect a historical network access record of the mobile application, and determine whether the network is accessed before, that is, determine whether the mobile application accesses the first network again, and if determining that the mobile application accesses the first network again, may directly acquire the IP address, corresponding to the network and stored in the mobile application locally, of the accessible network service.

In this embodiment of the present invention, when the mobile application accesses the first network for the first time, the mobile application needs to establish a connection to a network access apparatus and send a network access request to the network access apparatus of the network, for requesting to acquire an IP address of a currently accessible network service. IP addresses of accessible network services may be in an IP address list obtained from a plurality of IP addresses. The network access apparatus calculates, according to a current network environment of the mobile application, a batch of IP addresses of network services having optimal network quality and network quality of the IP addresses and returns the batch of IP addresses of network services having optimal network quality and the network quality of the IP addresses to the mobile application. The mobile application may select, based on the network quality of the IP addresses returned by the network access apparatus, an IP address having the best network quality to access the first network, where the network quality may be a network connection speed, a network data transmission speed, and data stability. When returning the IP addresses of the accessible network services and the network quality of the IP addresses to the mobile application, the network access apparatus may store the IP addresses and the network quality of the IP addresses in the mobile application locally.

When accessing the same network again, the mobile application may directly acquire an IP address corresponding to the network and stored in the mobile application and accesses the first network based on the IP address, so that a network access request does not need to be sent again, the number of times of requesting a network access state is reduced, and a time consumed for the network access of the mobile application is reduced. Certainly, in order to further reduce the time consumed for the network access, the mobile application may further acquire network connection quality of the IP address stored in the mobile application after acquiring the IP address stored in the mobile application, so as to directly access the first network based on the IP address having the optimal network connection quality in the first access without detecting the network connection quality of the IP address.

Step S506: Acquire network connection speeds of the plurality of IP addresses in the IP address list if the mobile application accesses the first network again.

When it is determined that the mobile application accesses the first network again, the network connection speed may be a speed of the network access, or may be a speed of data transmission between the mobile application and the network after the network access. The acquired network connection speeds of the plurality of IP addresses in the IP address list may be network connection speeds, which are obtained through detection by the mobile application, of the plurality of IP addresses in IP address list, or may be acquired network connection speeds of the plurality of IP addresses stored in the mobile application in historical access to the first network. For example, when accessing the first network for the first time, the mobile application may detect, after acquiring a plurality of IP addresses of accessible network services, a network connection speed of each IP address in the plurality of IP addresses and store the network connection speed of each IP address in the mobile application. When accessing the network again, the mobile application may acquire, after acquiring the plurality of IP addresses stored in the mobile application, the network connection speeds of the plurality of IP addresses prestored in the mobile application, to rapidly acquire an IP address having the highest network connection speed, and access the first network based on the IP address having the highest network connection speed, so as to reduce a time consumed for the network access of the mobile application. Certainly, the mobile application may also directly detect the network connection speeds of the plurality of IP addresses, to acquire an IP address having the highest network connection speed, and access the first network based on the IP address, obtained through detection, having the highest network connection speed.

Step S508: Compare the network connection speeds of the plurality of IP addresses and acquire an IP address having the highest network connection speed in the plurality of IP addresses.

After the network connection speeds of the plurality of IP addresses in the IP address list are acquired, the IP address having the highest network connection speed in the plurality of IP addresses is acquired by comparing the network connection speeds of the plurality of IP addresses. For example, when three IP addresses, which sequentially are 0.0.0.1, 0.0.0.2, and 0.0.0.3, are acquired, where acquired network connection speeds of the three IP addresses sequentially are 1 Mb/s, 2 Mb/s, and 3 Mb/s, the network connection speeds of the three IP addresses are compared to obtain the IP address 0.0.0.3 having the highest network connection speed, and the IP address 0.0.0.3 is acquired, so as to access the first network based on the IP address 0.0.0.3.

Step S510: Access the first network based on the IP address having the highest network connection speed.

After the IP address having the highest network connection speed in the plurality of IP addresses is acquired, the first network may be accessed based on the IP address having the highest network connection speed, or a network server corresponding to the IP address having the highest network connection speed may be connected to access the first network.

It should be noted that because a network connection speed can reflect network connection quality, in this embodiment of the present invention, acquisition of the network connection speeds of the plurality of IP addresses in the IP address list may be acquisition of network connection quality of the plurality of IP addresses in the IP address list, comparison of the network connection speeds of the plurality of IP addresses may be comparison of the network connection quality of the plurality of IP addresses, acquisition of the IP address having the highest network connection speed in the plurality of IP addresses may be acquisition of an IP address having the optimal network connection quality in the plurality of IP addresses, and access to the first network based on the IP address having the highest network connection speed may be access to the first network based on the IP address having the optimal network connection quality.

According to this embodiment of the present invention, when accessing the first network again, the mobile application acquires the network connection speeds of the plurality of IP addresses in the IP address list and compares the network connection speeds of the plurality of IP addresses to acquire the IP address having the highest network connection speed, and accesses the first network based on the IP address having the highest network connection speed, so that the mobile application can select an IP address having an optimal network service to access the first network, so as to further reduce the time consumed for accessing the network by the mobile application.

Preferably, step S506 may include: separately detecting the network connection speeds of the plurality of IP addresses in the IP address list. After the prestored IP addresses in the mobile application are acquired, the network connection speeds of the plurality of IP addresses in the IP address list may be separately detected by using the mobile application, so that a network connection speed of an IP address of a currently accessible network service in the network is acquired in time.

Optionally, in order to further improve the network access speed, step S506 may include: acquiring the network connection speeds of the plurality of IP addresses prestored in the mobile application. When accessing the network previously, the mobile application needs to detect network connection speeds of IP addresses of accessible network services and stores the detected network connection speeds of the IP addresses of the accessible network services in the mobile application locally, and when accessing the first network again, the mobile application directly acquires the network connection speeds of the plurality of IP addresses prestored in the mobile application, so as to avoid detecting the network connection speeds of the plurality of IP addresses, reduce the time consumed for the network access of the mobile application, and further improve the network access speed.

Figure 6:
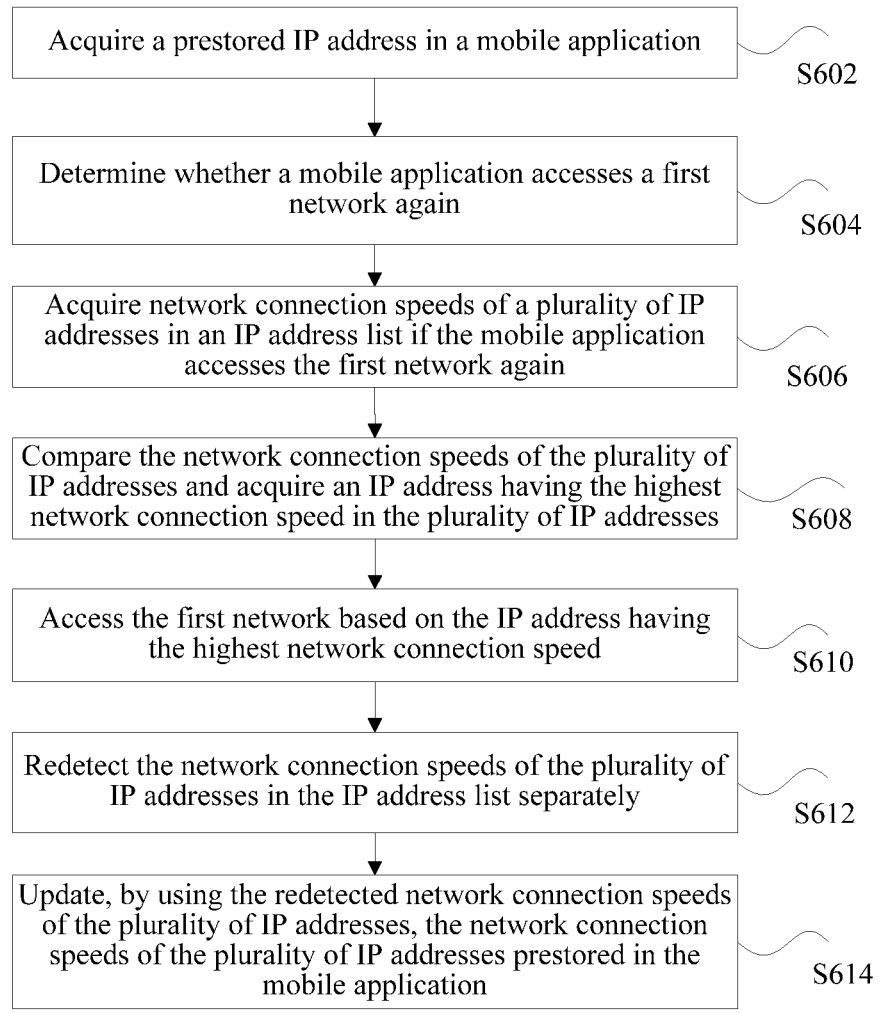
FIG. 6 is a flowchart of a network access method applied to a mobile application according to some embodiments of the present invention.

FIG. 6 is a flowchart of a network access method applied to a mobile application according to some embodiments of the present invention. The network access method applied to a mobile application in this embodiment may be a preferred implementation manner of the network access method applied to a mobile application in the foregoing embodiment. As shown in FIG. 6, the network access method applied to a mobile application includes the following steps:

Step S602, step S604, step S606, step S608, and step S610 are sequentially the same as step S502, step S504, step S506, step S508, and step S510 shown in FIG. 5, but are not limited to these steps, and details are not described herein again.

Step S612: Redetect the network connection speeds of the plurality of IP addresses in the IP address list separately.

After the first network is accessed based on the IP address having the highest network connection speed, separately redetecting the network connection speeds of the plurality of IP addresses in the IP address list may be separately detecting the network connection speeds of the plurality of IP addresses in the IP address list asynchronously at a backend of the mobile application. Because a network connection speed of an IP address in a network service is not unchanged, as time goes on, the network connection speed of the IP address may be caused to be different in different phases due to a fault of a network server or impacts of different weather and environments or facilities in the network environment. Therefore, after the first network is accessed, the network connection speeds of the plurality of IP addresses may be redetected by using the backend, so as to update the network connection speeds of the prestored IP addresses in the mobile application. Meanwhile, the normal use of the mobile application is not affected because the detection can be performed by using the backend. Certainly, after the network connection speeds of the plurality of IP addresses are redetected, it may be further determined whether the IP address of the currently accessed network service is an IP address having the highest network connection speed or having the optimal network connection quality, and if it is determined that the IP address of the currently accessed network service is not the IP address having the highest network connection speed or having the optimal network connection quality, the IP address of the current network access may be switched to the IP address having the highest network connection speed or having the optimal network connection quality, so as to improve the network connection quality in the running process of the mobile application.

Step S614: Update, by using the redetected network connection speeds of the plurality of IP addresses, the network connection speeds of the plurality of IP addresses prestored in the mobile application.

After the network connection speeds of the plurality of IP addresses in the IP address list are redetected separately, the network connection speeds of the plurality of IP addresses prestored in the mobile application may be updated by using the redetected network connection speeds of the plurality of IP addresses, that is, the redetected network connection speeds of the plurality of IP addresses are stored in the mobile application locally, so that the mobile application may directly acquire the updated network connection speeds of the plurality of IP addresses when accessing the first network next time.

According to this embodiment of the present invention, network connection speeds of a plurality of IP addresses in an IP address list are redetected separately and network connection speeds of the plurality of IP addresses prestored in a mobile application are updated by using the redetected network connection speeds of the plurality of IP addresses, so that the mobile application can directly acquire, when accessing a network each time, network connection speeds at a previous time and access a first network based on an IP address having the highest network connection speed at the previous time, so as to reduce a time consumed for each network access of the mobile application.

Figure 7:
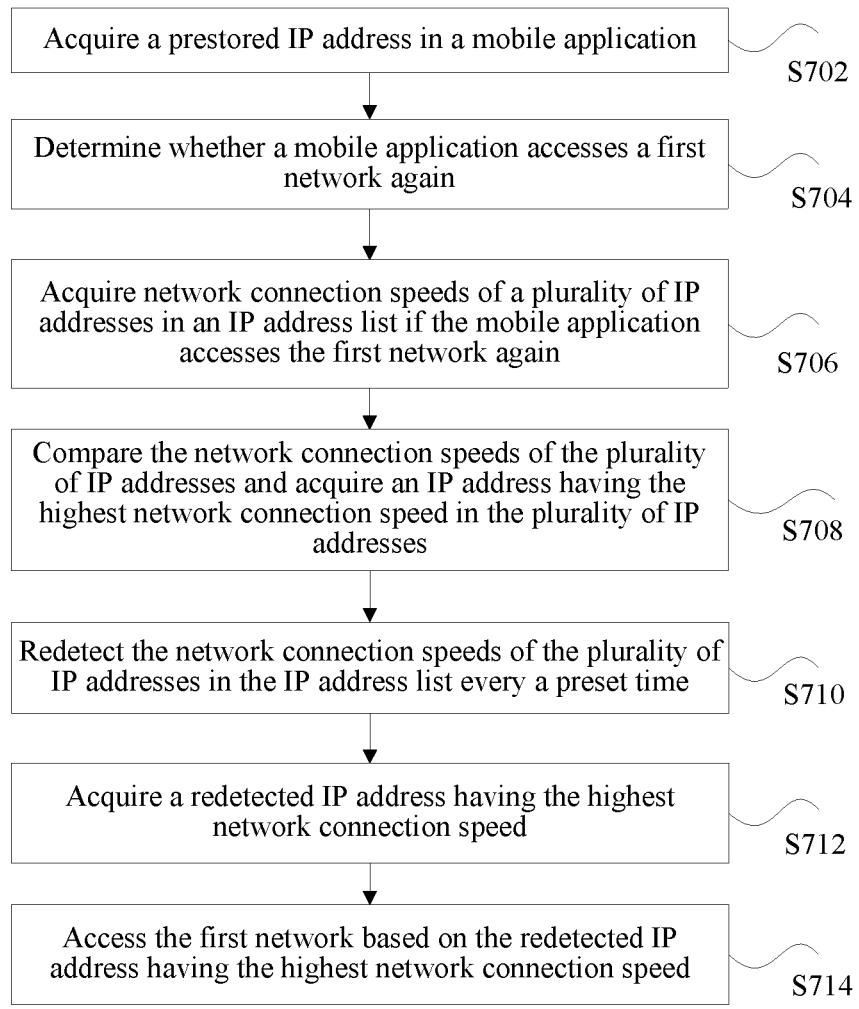
FIG. 7 is a flowchart of a network access method applied to a mobile application according to some embodiments of the present invention.

FIG. 7 is a flowchart of a network access method applied to a mobile application according to some embodiments of the present invention. The network access method applied to a mobile application in this embodiment may be a preferred implementation manner of the network access method applied to a mobile application in the foregoing embodiment. As shown in FIG. 7, the network access method applied to a mobile application includes the following steps:

Step S702, step S704, step S706, and step S708 are sequentially the same as step S502, step S504, step S506, and step S508 shown in FIG. 5, but are not limited to these steps, and details are not described herein again.

Step S710: Redetect the network connection speeds of the plurality of IP addresses in the IP address list every a preset time.

The preset time may be a preset period of time, for example, 5 minutes. The preset time may be set according to an actual network environment. As time goes on, a network connection speed of an IP address may be caused to be different in different phases due to a fault of a network server or impacts of different weather and environments or facilities in the network environment. Therefore, the network connection speeds of the plurality of IP addresses in the IP address list are redetected every the preset time, so as to detect an IP address currently having the highest network connection speed in time. Redetection of the network connection speeds of the plurality of IP addresses in the IP address list may be asynchronous detection performed by using a backend of the mobile application, so as to avoid affecting the use of the mobile application.

Step S712: Acquire a redetected IP address having the highest network connection speed.

After the network connection speeds of the plurality of IP addresses in the IP address list are detected each time, a redetected IP address having the highest network connection speed needs to be acquired to access the first network based on the IP address having the highest network connection speed.

Step S714: Access the first network based on the redetected IP address having the highest network connection speed.

According to this embodiment of the present invention, network connection speeds of a plurality of IP addresses in an IP address list are redetected every a preset time and a first network is accessed based on an IP address, obtained through redetection, having the highest network connection speed, so that a mobile application can switch to the IP address having the highest network connection speed in time in a running process, so as to improve network connection quality. Meanwhile, because the preset time is set, the problem that the network is unstable and the network quality is reduced due to switching of an IP address of a network service at any time can be avoided, so as to further improve the network connection quality.

Figure 8:
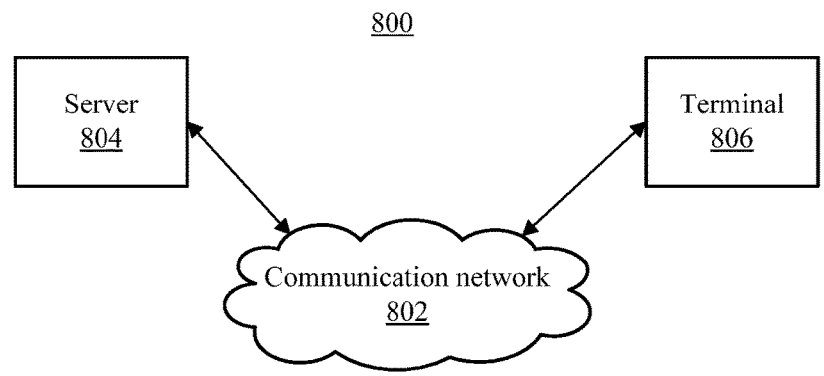
FIG. 8 depicts an exemplary environment incorporating certain disclosed embodiments.

The exemplary methods, devices and servers can be implemented, for example, in an exemplary environment 800 as shown in FIG. 8.

Environment 800 can include a server 804, a terminal device 806, and a communication network 802. The server 804 and the terminal device 806 may be coupled through the communication network 802 for information exchange, such as webpage browsing, Internet searching, data downloading, data transmitting, etc. Although only one terminal device 806 and one server 804 is shown in the environment 800, any number of terminal devices 806 or servers 804 may be included, and other devices may also be included.

Communication network 802 may include any appropriate type of communication network for providing network connections to the server 804 and terminal device 806 or among multiple servers 804 or terminal devices 806. For example, communication network 802 may include the Internet or other types of computer networks or telecommunication networks, either wired or wireless.

The terminal device 806 can include any appropriate user terminal with certain computing capabilities, such as a smart phone or mobile phone, a personal computer (PC), a work station computer, a server computer, a hand-held computing device (tablet), or any other user-side computing device.

The server 804 can be configured to provide certain server functionalities, such as database management and search engines. A server may also include one or more processors to execute computer programs in parallel.

The server 804 and the terminal device 806 may be implemented on any appropriate computing platform. For example, a mobile application of terminal 806 may accesses a communication network 802 previously, an IP address of a network service accessible to the mobile application in the network is stored in the mobile application locally. The mobile application may directly acquire the prestored IP address when determining that the mobile application accesses the same network again and accesses the network based on the IP address.

Figure 9:
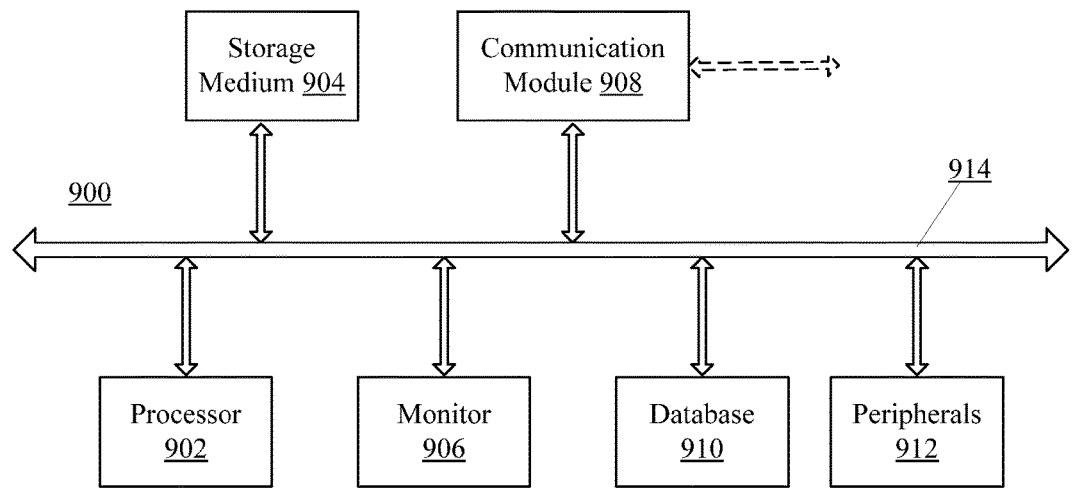
FIG. 9 depicts an exemplary computer system consistent with the disclosed embodiments.

FIG. 9 shows a block diagram of an exemplary computer system 900 suitable for the server 804 and/or the terminal device 806. As shown in FIG. 9, the exemplary computer system 900 may include a processor 902, a storage medium 904, a monitor 906, a communication module 908, a database 910, peripherals 912, and one or more bus 914 to couple the devices together. Certain devices may be omitted and other devices may be included.

Processor 902 can include any appropriate processor or processors. Further, processor 902 can include multiple cores for multi-thread or parallel processing. Storage medium 904 (e.g., non-transitory computer readable storage medium) may include memory modules, such as ROM, RAM, and flash memory modules, and mass storages, such as CD-ROM, U-disk, removable hard disk, etc. Storage medium 904 may store computer programs for implementing various processes, when executed by processor 902.

Further, peripherals 912 may include I/O devices such as keyboard and mouse, and communication module 908 may include network devices for establishing connections through the communication network 802. Database 910 may include one or more databases for storing certain data and for performing certain operations on the stored data, such as webpage browsing, database searching, etc.

In operation, terminal device 806 (e.g., operated by a user), such as a mobile phone, may cause server 804 to perform certain actions, such as an Internet search or other database operations. Server 804 may be configured to provide structures and functions for such actions and operations. More particularly, server 804 may include a data searching system for real-time database searching.

As such, various embodiments solve technical problem of a server technology, and/or terminal device technology. It should be understood that steps described in various methods of the present disclosure may be carried out in order as shown, or alternately, in a different order. Therefore, the order of the steps illustrated should not be construed as limiting the scope of the present disclosure. In addition, certain steps may be performed simultaneously.

In the present disclosure each embodiment is progressively described, i.e., each embodiment is described and focused on difference between embodiments. Similar and/or the same portions between various embodiments can be referred to with one another. In addition, exemplary device and/or servers are described with respect to corresponding methods.

The disclosed methods, devices, and/or servers can be implemented in a suitable computing environment. The disclosure can be described with reference to symbol(s) and step(s) performed by one or more computers, unless otherwise specified. Therefore, steps and/or implementations described herein can be described for one or more times and executed by computer(s). As used herein, the term "executed by computer(s)" includes an execution of a computer processing unit on electronic signals of data in a structured type. Such execution can convert data or maintain the data in a position in a memory system (or storage device) of the computer, which can be reconfigured to alter the execution of the computer as appreciated by those skilled in the art. The data structure maintained by the data includes a physical location in the memory, which has specific properties defined by the data format. However, the embodiments described herein are not limited. The steps and implementations described herein may be performed by hardware.

As used herein, the term "module" or "unit" can be software objects executed on a computing system. The software objects, such as computer programs, may be stored in a computer readable media. The software objections, e.g., computer programs, may be executed by a processor to implement the functions described in relation to FIGS. 1-7. A variety of components described herein including elements, modules, units, engines, and services can be executed in the computing system. The methods, devices, and/or servers can be implemented in a software manner. Of course, the methods, devices, and/or servers can be implemented using hardware. All of which are within the scope of the present disclosure.

A person of ordinary skill in the art can understand that the units/modules included herein are described according to their functional logic, but are not limited to the above descriptions as long as the units/modules can implement corresponding functions. Further, the specific name of each functional module is used to be distinguished from one another without limiting the protection scope of the present disclosure.

It should be noted that, for the foregoing method embodiments, for the brevity of description, the method embodiments are described as a series of action combinations. But a person skilled in the art should appreciate that the present disclosure is not limited to the order of the described actions, because according to the present disclosure, some steps may be performed in another order or performed simultaneously. A person skilled in the art should also know that the embodiments described in this specification all belong to preferred embodiments, and the involved actions and modules are not necessarily required by the present disclosure.

In the foregoing embodiments, the description of each of the embodiments has respective focuses. For a part that is not described in detail in a certain embodiment, reference may be made to related descriptions in other embodiments.

In the several embodiments provided by this application, it should be understood that, the disclosed apparatus may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and the parts displayed as units may or may not be physical units, may be located in one position, or may be distributed on a plurality of network units. Some or all of the units may be selected to achieve the objectives of the solutions of the embodiments according to actual needs.

In addition, functional units in the embodiments of the present invention may be integrated into one processing unit, or each of the units may exist alone physically, or two or more units may be integrated into one unit. The integrated unit may be implemented in a form of hardware, or may be implemented in a form of a software functional unit.

When the integrated unit is implemented in a form of a software functional unit and sold or used as an independent product, the integrated unit may be stored in a computer-readable storage medium. Based on such an understanding, the technical solutions of the present disclosure essentially, or the part contributing to the existing technology, or all or some of the technical solutions may be implemented in a form of a software product. The computer software product is stored in a storage medium and includes several instructions for instructing a computer device (which may be, for example, a PC, a mobile terminal, a server, or a network device) to perform all or some of the steps of the method described in the embodiments of the present invention. The foregoing storage medium includes: any medium that can store program code, such as a USB flash drive, a read-only memory (ROM), a random access memory (RAM), a removable hard disk, a magnetic disc, or an optical disc.

The foregoing descriptions are merely preferred embodiments of the present invention but are not intended to limit the present disclosure. A person skilled in the art can make various modifications and variations to the present disclosure. Any modification, equivalent replacement, or improvement made within the spirit and principle of the present disclosure shall fall within the protection scope of the present disclosure.

What is claimed is:

1. A network access method applied to a mobile application, at an electronic device comprising one or more processors and memory for storing program modules that are executed by the one or more processors, the method comprising:
    acquiring a plurality of prestored IP addresses in the mobile application, the plurality of prestored IP addresses being IP addresses that are obtained when the mobile application previously accessed a network service to connect the mobile application with a server;
    acquiring network connection quality of the plurality of IP addresses and obtaining an IP address list of the network connection quality accessing the network service through the plurality of IP addresses;
    determining whether the mobile application accesses the first network service again; and
    accessing the first network service based on the plurality of stored IP addresses if the mobile application accesses the network service again; and
    accessing the network service using an IP address having a highest network connection quality in the IP address list.

2. The method according to claim 1, wherein the acquiring network connection quality of the plurality of IP addresses and obtaining an IP address list of the connection quality of the plurality of IP addresses accessing the network service comprises:
    detecting the network connection quality of the plurality of IP addresses in the IP address list separately; or
    acquiring the network connection quality of the plurality of IP addresses prestored in the mobile application.

3. The method according to claim 2, wherein after the accessing the first network service using the IP address having the highest network connection speed quality, the network access method further comprises:
    redetecting the network connection quality of the plurality of IP addresses in the IP address list separately; and
    updating, by using the redetected network connection quality of the plurality of IP addresses, the network connection quality of the plurality of IP addresses prestored in the mobile application.

4. The method according to claim 1, wherein the accessing the first network service using the IP address having the highest network connection quality comprises:
    redetecting the network connection quality of the plurality of IP addresses in the IP address list every a preset time;
    acquiring a redetected IP address having the highest network connection quality; and
    accessing the network service based on the redetected IP address having the highest network connection quality.

5. The method according to claim 1, wherein the network connection quality comprises a network connection speed, a network data transmission speed, and data stability.

6. The method according to claim 5, wherein acquiring the network connection quality of the plurality of IP addresses comprises:
acquiring the network connection speed, the network data transmission speed, and the data stability accessing the network service through the plurality of IP addresses.

7. A network access apparatus applied to a mobile application, comprising:
one or more processors; and
memory coupled to the one or more processors, wherein the one or more processors are configured to:
acquire a plurality of prestored IP addresses in the mobile application, the plurality of prestored IP addresses being IP addresses that are obtained when the mobile application previously accessed a network service to connect the mobile application with a server;
acquire network connection quality of the plurality of IP addresses and obtaining an IP address list of the network connection quality accessing the network service through the plurality of IP addresses;
determine whether the mobile application accesses the network service again; and
access the network service based on the plurality of stored IP address addresses when the mobile application accesses the network service again; and
access the network service using an IP address having a highest network connection quality in the IP address list.

8. The apparatus according to claim 7, wherein the one or more processors are further configured to:
detect the network connection quality of the plurality of IP addresses in the IP address list separately; or
acquire the network connection quality of the plurality of IP addresses prestored in the mobile application.

9. The apparatus according to claim 8, wherein the one or more processors are further configured to:
redetect, after the network service is accessed based on the IP address having the highest network connection quality, the network connection quality of the plurality of IP addresses in the IP address list separately; and
update, by using the redetected network connection quality of the plurality of IP addresses, the network connection quality of the plurality of IP addresses prestored in the mobile application.

10. The apparatus according to claim 7, wherein the one or more processors are further configured to:
redetect the network connection quality of the plurality of IP addresses in the IP address list every a preset time;
acquire a redetected IP address having the highest network connection quality; and
access the network service based on the redetected IP address having the highest network connection quality.

11. The apparatus according to claim 7, wherein the network connection quality comprises a network connection speed, a network data transmission speed, and data stability.

12. The apparatus according to claim 11, wherein acquire the network connection quality of the plurality of IP addresses comprises:
acquire the network connection speed, the network data transmission speed, and the data stability accessing the network service through the plurality of IP addresses.

* * * * *